United States Patent [19]

Lapeyre

[11] 4,084,687
[45] Apr. 18, 1978

[54] CONVEYOR HAVING RESILIENT CONVEYING SURFACE

[75] Inventor: James M. Lapeyre, New Orleans, La.

[73] Assignee: The Laitram Corporation, New Orleand, La.

[21] Appl. No.: 702,035

[22] Filed: Jul. 2, 1976

[51] Int. Cl.² .............................................. B65G 17/06
[52] U.S. Cl. ........................................ 198/844; 198/850
[58] Field of Search ................. 198/831, 844, 850, 853

[56] References Cited

U.S. PATENT DOCUMENTS

| 736,901 | 8/1903 | Willson | 198/850 |
|---|---|---|---|
| 2,268,542 | 1/1942 | Bergmann | 198/850 |
| 2,443,947 | 6/1948 | Brooks et al. | 198/850 |
| 3,202,266 | 8/1965 | Schmermund | 198/850 |
| 3,209,897 | 10/1965 | Rice | 198/850 |
| 3,317,030 | 5/1967 | Davis | 198/853 |
| 3,349,893 | 10/1967 | Jordan et al. | 198/850 |
| 3,685,637 | 8/1972 | Bildsoe | 198/850 |
| 3,730,331 | 5/1973 | Goldberg | 198/850 |
| 3,788,455 | 1/1974 | Dieckmann | 198/850 |

FOREIGN PATENT DOCUMENTS

| 970,460 | 9/1958 | Germany | 198/850 |
|---|---|---|---|
| 1,099,920 | 2/1961 | Germany | 198/850 |
| 874,040 | 8/1961 | United Kingdom | 198/850 |
| 985,361 | 3/1965 | United Kingdom | 198/850 |

*Primary Examiner*—Evon C. Blunk
*Assistant Examiner*—Jeffrey V. Nase
*Attorney, Agent, or Firm*—Maxham & Schurgin Weingarten

[57] ABSTRACT

A movable link conveyor having an elastomeric effectively continuous conveying surface capable of remaining substantially flat during movement of the conveyor through a curved travel path in the plane of the conveying surface.

5 Claims, 6 Drawing Figures

U.S. Patent  April 18, 1978  4,084,687
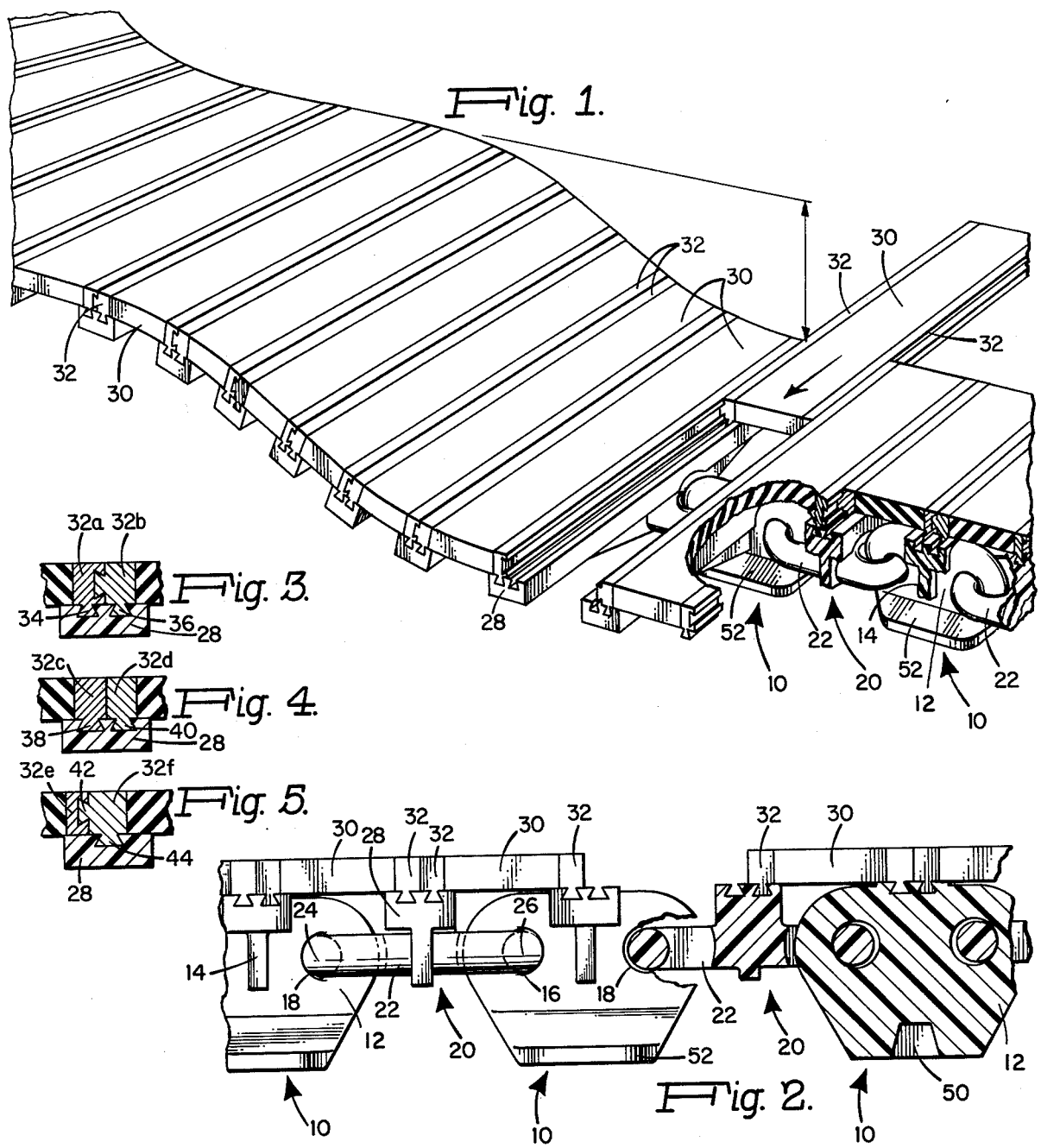

CONVEYOR HAVING RESILIENT CONVEYING SURFACE

FIELD OF THE INVENTION

This invention relates to conveyors and more particularly to conveyors adapted for movement along a curved path and having a flat effectively continuous conveying surface.

BACKGROUND OF THE INVENTION

A conveyor is shown in copending application Ser. No. 620,579, filed Oct. 8, 1975 entitled Modular Conveyor, now abandoned in favor of continuation application Ser. No. 802,176, filed May 31, 1977, assigned to the same assignee as this invention, which is constructed and operative for movement along a path which can be curved in the plane of the conveyor as well as being curved in directions transverse thereto. Such conveyor includes an upper conveying surface which is substantially flat and defined by the upper surfaces of the interconnected conveyor links. The conveying surface is not, however, continuous in that this surface is interrupted by the gaps between adjacent interconnected links. For some purposes it is useful to have a continuous conveying surface without openings between adjacent links, such as for the conveyance of small items which could fall through the gaps of adjacent links.

SUMMARY OF THE INVENTION

In accordance with the present invention, a multiple link conveyor is provided having an elastomeric effectively continuous conveying surface capable of remaining substantially flat during movement of the conveyor through a curved travel path in the plane of the conveying surface. The conveying surface is in preferred embodiment defined by a plurality of elastomeric sheet sections, each secured to a plurality of interconnected links of the conveyor to appropriate fastening means, the sections being butted together to form an effectively continuous surface. The elastomeric sheet sections are sufficiently flexible to accomodate conveyor motion around a curved path in the conveying plane while retaining a substantially flat conveying surface.

DESCRIPTION OF THE DRAWINGS

The invention will be more fully understood from the following detailed description taken in conjunction with the accompanying drawings, in which:

FIG. 1 is a cutaway pictorial view of a conveyor according to the invention;

FIG. 2 is a cutaway elevational view of the embodiment of FIG. 1;

FIGS. 3 through 5 are sectional elevation views of alternative means for interconnecting adjacent elastomeric sheet sections; and FIG. 6 is a plan view of the embodiment of FIG. 1 illustrating movement through a curved path.

DETAILED DESCRIPTION OF THE INVENTION

Referring to FIGS. 1 and 2, there is shown a preferred embodiment of a conveyor having an elastomeric conveying surface and capable of remaining substantially flat during movement around curves in the plane of the conveying surface and also capable of accomodating conveyor movement around curves in directions transverse to the conveying surface. A plurality of modular links are provided, alternate ones of the links being of identical construction and cooperative with adjacent links to form the conveyor. The modules 10 include a central body portion 12 and a transversely disposed member 14 affixed to or integral therewith which provides arms outwardly extending from opposite sides of the centrally disposed body portion 12. The body portion 12 includes openings 16 and 18 therein for accomodation of adjacent links. The modules 20 which are coupled to the modules 10 include a central portion 22 having arcuate end portions 24 and 26 which are linked through respective openings 18 and 16 of adjacent links. A transverse member 28 is affixed to or integral with central portion 22 and provides arms which outwardly extend from opposite sides of portion 22.

Each module 10 and 20 is preferably of integral construction and formed by molding of suitable plastic material such as polyethylene. The modules 10 are in preferred embodiment fabricated in upper and lower halves, one half portion of module 10 being coupled to adjacent module 20, the other half portion of module 10 then being mated and bonded to the first half to complete the modular link. The conveyor described thus far is similar to that shown in the aforesaid copending application of the same assignee as herein. In the present invention, a resilient support is provided having a continuous or effectively continuous conveying surface with no openings or gaps between adjacent links and which is capable of substantially flat disposition even during movement of the conveyor through a curved travel path in the plane of the conveying surface.

As shown in FIG. 1 and 2, the resilient conveying surface is composed of a plurality of sections 30 each formed of generally rectangular sheets or strips of elastomeric material with each section being secured to the conveyor links by fastening members 32 disposed along the sides of sections 30. The elastomeric material is sufficiently elastic to compress and expand to accomodate curved conveyor motion while also being capable of good wear. In the illustrated embodiment, fastening members 32 are elongated rigid members bonded to the sides of associated sections 30 and having keyed elements for attachment to the links and to adjacent sections. The particular means for affixing the resilient conveying surface sections to the links can take a variety of forms. The fastening means shown in FIG. 1 is shown more particularly in FIG. 3 and includes a fastening member 32a bonded to the resilient material of section 30 and having a key 34 which is retained within a slot provided in the transverse members 14 and 28 of the modular links. The fastening member 32a also includes a keyway which is cooperative with a key of adjacent fastener 32b and which in turn includes a key 36 secured within a keyway in link members 14 and 28. Thus, each resilient section 30 is secured to the supporting links and to adjacent sections to provide an effectively continuous resilient conveying surface. Repair or replacement of the conveying surface is readily accomplished by removal of one or more sections 30 and replacement thereof by slidable insertion of new sections into position, as shown in FIG. 1.

An alternative fastening means is shown in FIG. 4 wherein the fastener members 32c and 32d of adjacent sections 30 are connected by respective keys 38 and 40 to associated slots of a conveyor link, with adjacent sections being butted together without any keyed or other attachment. A further fastening means is shown in FIG. 5 wherein one section 30 includes a fastener strip 32e having a keyway cooperative with a key 42 of fastener 32f of the adjacent section 30, which is also joined by key 44 to a keyway of a conveyor link.

The conveyor links are movable with respect to each other in the plane of the conveyor surface to provide movement of the conveyor in a curved path parallel to the plane of the conveyor surface. The links are also movable within planes transverse to the conveyor surface to permit movement of the conveyor through a curved path in such transverse planes. The continuous resilient conveying surface accomodates to curved motion of the conveyor by expansion and compression of corresponding portions of the sections 30. Thus, during conveyor movement in a curved path in the plane of the conveying surface as shown in FIG. 6, a portion of the sections 30 inward of the curve are compressed while the portions of the sections outward of the curve are expanded. The resiliency and thickness of the strip members are such to provide intended compression and expansion without material deformation of the flat conveying surface. Thus, the conveying surface remains substantially flat during curved motion in the plane of this surface. The resiliency of the sections 30 also permits movement of the conveyor in planes transverse to the conveying surface as can be seen in FIG. 1.

The conveyor is moved through its path by one or more drive sprockets which are part of a drive mechanism and which include sprocket teeth cooperative with openings 50 in link members 10. The conveyor is installed for movement about an intended path on a support structure which extends along the travel path or selected portions thereof. Typically, the support structure includes plates on which rest the bottom surfaces of the arms of the link modules, and guide members can be disposed above outwardly extending bottom plates 52 of modules 10 to retain the conveyor in intended disposition and prevent tipping of the conveyor modules as they are moved through a curved path.

It will be appreciated that the conveyor can be constructed of various materials and of various sizes to suit particular performance requirements. The specific implementation of the link modules and resilient effectively continuous conveyor surface can also be modified without departing from the spirit and true scope of the invention. Accordingly, the invention is not to be limited by what has particularly shown and described except as indicated in the appended claims.

What is claimed is:

1. A conveyor comprising:
  a plurality of resilient conveyor sections providing a substantially continuous, flat conveying surface and each including:
    a rectangular block of elastomeric material;
    first and second elongated, rigid, fastening members of a length substantially coextensive with the length of said block and each bonded to a respective opposite side of said block;
    the upper surface of said fastening members being substantially coplanar with the upper surface of said block to define said conveying surface;
  a plurality of first and second modules each having:
    a central linking portion terminating in first and second linking ends;
    first and second arms integrally formed with said central linking portion and outwardly extending therefrom in respective opposite directions along a transverse axis;
    fastening means extending along substantially the entire length of said arms;
  the linking ends of each of said first modules being movably coupled to respective linking ends of adjacent ones of said second modules;
  said first and second modules thus coupled being angularly movable relative to one another about each coupled linking end in planes parallel and orthogonal to said conveying sections;
  the first fastening member of each conveying section being releasably engageable with the fastening means of said first module, and the second fastening member of said conveying section being releasably engageable with the fastening means of an adjacent linked second module, the fastening members of each conveying section being in butting relation with confronting, fastening members of adjacent conveying sections and including fastening means for releasable engagement with the confronting butting fastening members of adjacent conveying sections; and
  said conveying sections when coupled to said modules extending across the linking ends thereof and providing a substantially flat continuous, resilient conveying surface.

2. A conveyor according to claim 1 wherein said first and second fastening members of each conveying section are slidably releasable from the fastening means of adjacent linked modules.

3. A conveyor according to claim 1 wherein said first and second fastening members of each conveying section are slidably releasable from the fastening means of adjacent linked modules and from the confronting butting fastening members of adjacent conveying sections.

4. A conveyor according to claim 1 wherein said first and second fastening members of each conveying section each includes a keyed element extending along the length thereof and slidably engageable with a cooperative keyed element of the fastening means of adjacent linked modules.

5. A conveyor according to claim 1 wherein said first and second fastening members of each conveying section each includes a keyed element extending along the length thereof and slidably engageable with a cooperative keyed element of the fastening means of adjacent linked modules and a keyed element extending along the length thereof and slidably engageable with a cooperative keyed element of the confronting butting fastening members of adjacent conveying sections.

* * * * *